Figure 1:
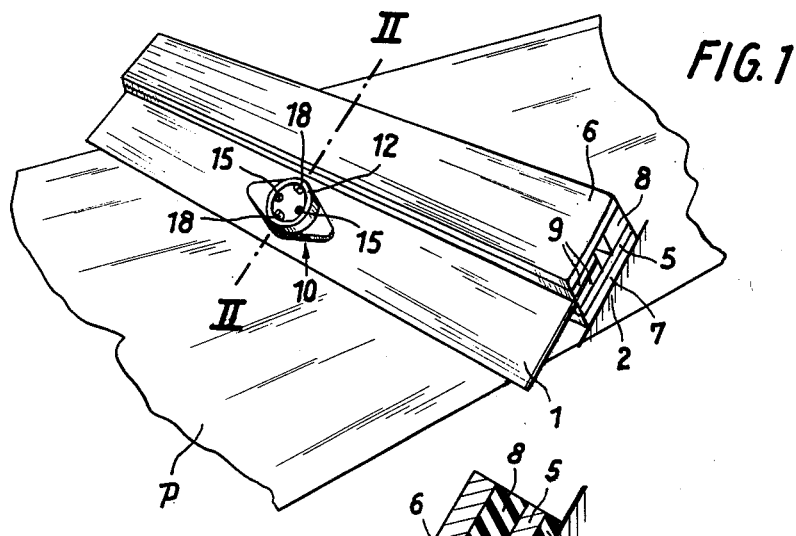

INVENTOR.
HELMUT SCHAEFER ns Patent Office 3,164,015
Patented Jan. 5, 1965

3,164,015
APPARATUS FOR DETECTING SURFACE IMPERFECTIONS ON MOVING WEBS, ESPECIALLY OF PAPER
Helmut Schäfer, Neuffen, Wurttemberg, Germany, assignor to Hans Biel, Wurttemberg, Germany
Filed Nov. 8, 1962, Ser. No. 236,236
Claims priority, application Germany, Nov. 16, 1961, B 64,811
5 Claims. (Cl. 73—159)

The present invention relates to an apparatus for detecting surface imperfections on webs of materials, especially paper webs, while they are traveling in one direction, for example, toward a crosscutter in which sheets containing the imperfections are cut out and eliminated. This apparatus is provided with a feeler element which engages upon the moving web of material, and with an electric signal transmitter which is influenced by this feeler element and is capable by changes in its electrical values to control the operation of the cross-cutter to cut out the defective sheets.

In a prior apparatus of this type the feeler element which engages upon the moving paper web is of light weight and a resilient construction and secured to a heavy swivel member on which the electric signal transmitter, for example, an electric crystal sound pickup, is mounted which is acted upon by the elastic deformations of the feeler element which are caused by projecting parts on the paper web. This prior apparatus has a series of disadvantages. For examining a web of a considerable width, it is necessary to provide several of these apparatus. This renders the mechanical construction and the electrical equipment of the entire apparatus very complicated and expensive, especially also because the various elements must be separately adjusted. There is also always the danger that at a high traveling speed of the paper web, the sound pickups will be damaged by thick projections, for example, by lumps of glue which are embedded in the web. Furthermore, for examining both the upper and lower sides of the paper web the direction of movement of the web must be changed several times since it can only run underneath the feeler element. There is also no possibility to avoid that imperfections of an equal size will produce electric signals of different intensities, depending upon whether they occur near the edges or at the center of the individual feeler elements.

It is an object of the present invention to provide an apparatus for detecting surface imperfections on moving webs, especially of paper, in which the feeler element consists of a rigid slide member which is insulated from all outer influences and is made of a material of a high sound conductivity. On this slide member a body of a low weight is suspended so as to be freely oscillating relative to the slide member. When a sound occurs in the slide member, this light body is adapted to carry out motions relative to the slide member which act upon the signal transmitter which is also mounted on the slide member.

It is an important advantage of this apparatus that it does not contain any parts which have to be adjusted. Only a single feeler element and a single signal transmitter are required for checking the entire width of the web, and it is immaterial whether the surface imperfections are located near the edges or at the center of the web. This also means that only a single amplifier is required for transforming the transmitted signals into electrical values of a sufficient strength to be used for control purposes, for example, of the crosscutter. Since the feeler element forms a rigid plate which is not bent by the moving paper web, there is no danger that any sensitive elements might be damaged even if the feeler element is acted upon by considerable mechanical influences, especially by larger local projections on the quickly moving paper web. A further advantage of the new apparatus is due to the fact that it may be applied upon the web of paper or other material from above as well as from below so that no complicated guide roller systems are required for changing the direction of movement of the web.

For transforming the motions of the light-weight body which only amount to a few $\mu$ into changes of electrical values, it is advisable to employ piezoelectric crystals, such as Rochelle-salt crystals, which transform the forces acting upon the apparatus into changes in voltage. It is, however, also possible to employ a differential transformer which is detuned by changes in the position of the small suspended body and the detuning of which is utilized as a measuring value. Furthermore, inductive as well as capacitive indicators may also be employed.

The features and advantages of the invention will become more clearly evident from the following detailed description of one preferred embodiment thereof which is illustrated in the accompanying drawings, in which—

Figure 2:
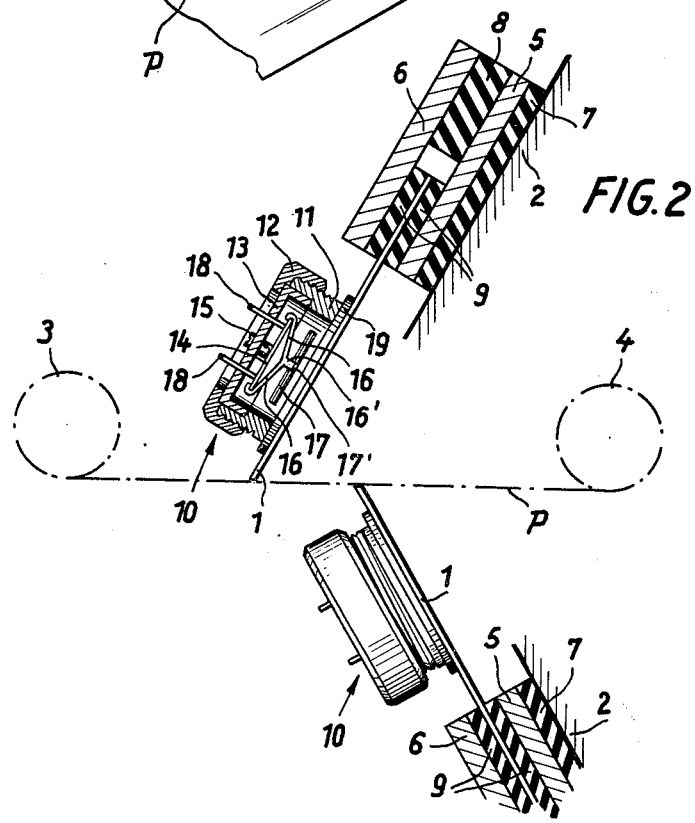

FIGURE 1 shows a perspective view of the feeler element and the signal transmitter thereon; while FIGURE 2 shows a cross section which is taken along line II—II of FIGURE 1.

In the drawings, the feeler element is indicated at 1. It consists of a rigid elongated plate, preferably of steel, which is clamped along one of its longitudinal sides by a holder which is secured to the machine frame, while its opposite longitudinal side engages with a light pressure upon the moving paper web P between guide rollers 3 and 4. The holder consists of a pair of clamping plates 5 and 6 and it is cushioned by a hard rubber plate 7 relative to the machine frame against any sound which might occur in the material of the machine frame. The two clamping plates 5 and 6 and the part of the feeler element 1 which is clamped between them are also cushioned relative to each other by hard rubber strips 8 and 9. In this manner, no outer disturbances can reach the feeler element and the latter can only be acted upon by the sound which may be caused by projections on the moving paper web. The feeler element 1 is made so rigid that it cannot be bent by the passing paper web or even by large local projections thereon, and therefore it only conducts the sound which is produced by such projections.

The feeler element 1 carries the signal transmitter which is generally indicated at 10 and comprises a capsule 11 which is secured to the feeler element 1 and contains a Bakelite disk 13 which is secured to the capsule by a screw ring 12 and serves as an electrically insulating support of a Rochelle-salt crystal 14. This crystal forms a thin disk of a substantially square shape which consists of several thin layers with a metal foil embedded therein. On two diagonally opposite corners this crystal disk is secured by screws 15 to the Bakelite disk 13, while the other corners of the crystal disk carry a metal bracket 16 which is connected to a light-weight body 17 of about 1 to 2 grams which may be, for example, in the form of a small brass disk. For this purpose, bracket 16 is provided with a small pin 16' which is glued into a central aperture 17' in the brass disk 17. On two opposite sides the crystal disk 14 carries electric connecting elements 18 which project through the Bakelite disk 13 to the outside and to which electric wires may be connected.

The body sound occurring in the feeler element 1 when the paper web P slides along the same is transmitted through the capsule 11, 12, the Bakelite disk 13, the screws 15, the crystal 14, and the metal bracket 16 to the light body 17 which because of its free-swinging suspension by means of the metal bracket 16 carries out vibratory movements, the amplitude of which depends upon the strength of the body sound occurring in the feeler element 1. By these vibratory movements of the light body 17, bending stresses are exerted upon the crystal disk 14 which produce a piezoelectric effect in the form of small changes in voltage between the connecting elements 18. By means of an amplifier, these changes in voltage are then amplified in a conventional manner to a strength sufficient for carrying out control operations.

Between the feeler element 1 and the capsule 11 of the signal transmitter a thin rubber disk 19 is inserted which eliminates the vibrations of a high frequency and small amplitudes which are produced by the normal roughness of the paper. Essentially, the body 17 is therefore excited into vibrations only when during the passage of the paper web any projections thereon produce a sound of a high amplitude in the feeler element. Any increase in thickness of the paper web which extends over a greater length thereof and are not regarded as imperfections remain without effect upon the apparatus.

In order to insure that only vibrations with high amplitudes will be effective, it is also possible to employ in place of the rubber disk 19 a band filter as known in the radio art which can electrically select vibrations with certain characteristics.

The weight of the body 17 determines the lower cutoff frequency. It is therefore possible to select preferred frequencies in accordance with the dimensions of the crystal system.

The feeler element 1 may engage upon the upper surface as well as the lower surface of the paper web. As illustrated in FIGURE 2, two feeler elements may therefore be applied from above and below upon the same strand of the moving paper web and it is merely necessary to mount them so as to engage with the web at two lines which are spaced at a short distance longitudinally from each other.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. An apparatus for detecting surface imperfections in moving webs of sheet materials, especially of paper, comprising a rigid slide member having good sound transmitting qualities and a length essentially equal to the width of said moving web, means for mounting said slide member in contact with the surface of said moving web including insulating means for preventing the application of outer vibrations to said slide member by way of said mounting means, an electrical signal transmitter secured to and acted upon by said slide member including a light-weight body freely suspended within said electrical signal transmitter and responsive to vibrations in said slide member, and control means connecting said light-weight body to said signal transmitter for controlling the signal output of said transmitter in correspondence with the movements of said light-weight body responsive to the vibrations in said slide member.

2. An apparatus as defined in claim 1, in which said slide member contacts said moving web with one longitudinal edge thereof and is positioned by said means for mounting at an angle to the surface of said web.

3. An apparatus as defined in claim 1, in which said signal transmitter further comprises a capsule secured to said slide member, a piezoelectric crystal disk mounted in said capsule, and said control means comprises a metal bracket for suspending said light-weight body on said crystal disk.

4. An apparatus as defined in claim 3, further comprising a rubber disk inserted between said slide member and said capsule for eliminating vibrations of low amplitudes.

5. An apparatus for detecting surface imperfections in moving webs of sheet materials, especially of paper, comprising a pair of rigid slide members having good sound transmitting qualities and a length essentially equal to the width of said moving web, means for mounting said slide members in contact with the surface of said moving web including insulating means for preventing the application of outer vibrations to said slide members by way of said mounting means, an electrical signal transmitter secured to and acted upon by said slide members including a light-weight body freely suspended within said electrical signal transmitter and responsive to vibrations in said slide members, and control means connecting said light-weight body to said signal transmitter for controlling the signal output of said transmitter in correspondence with the movements of said light-weight body responsive to the vibrations in said slide members, one of said slide members and the associated elements thereon engaging with each flat side of said web.

References Cited by the Examiner
UNITED STATES PATENTS

| | | | |
|---|---|---|---|
| 1,562,578 | 11/25 | Nicolson | 179—101 |
| 2,752,781 | 7/56 | Thorsen | 73—159 |
| 2,763,152 | 9/56 | Birdsall | 73—69 X |
| 2,922,303 | 1/60 | Veneklasen et al. | 73—159 |

RICHARD C. QUEISSER, *Primary Examiner.*

JOSEPH P. STRIZAK, *Examiner.*